US007340747B1

(12) United States Patent
Zeliger et al.

(10) Patent No.: US 7,340,747 B1
(45) Date of Patent: Mar. 4, 2008

(54) SYSTEM AND METHODS FOR DEPLOYING AND INVOKING A DISTRIBUTED OBJECT MODEL

(75) Inventors: Ohad Zeliger, Westborough, MA (US); Richard Francis Cormier, Franklin, MA (US)

(73) Assignee: EMC Corporation, Hopkinton, MA (US)

( * ) Notice: Subject to any disclaimer, the term of this patent is extended or adjusted under 35 U.S.C. 154(b) by 713 days.

(21) Appl. No.: 10/674,321

(22) Filed: Sep. 30, 2003

(51) Int. Cl.
*G06F 9/54* (2006.01)
*G06F 9/445* (2006.01)

(52) U.S. Cl. ............ 719/328; 719/316; 709/217; 709/203; 709/227; 717/101; 717/162; 717/106

(58) Field of Classification Search ........... None
See application file for complete search history.

(56) References Cited

U.S. PATENT DOCUMENTS 6,006,230 A * 12/1999 Ludwig et al. ............ 707/10
6,085,030 A * 7/2000 Whitehead et al. ........ 709/203
7,080,078 B1 * 7/2006 Slaughter et al. .......... 707/10
2003/0204557 A1 * 10/2003 Mandal et al. ............ 709/202

\* cited by examiner

*Primary Examiner*—William Thomson
*Assistant Examiner*—Abdou K Seye
(74) *Attorney, Agent, or Firm*—Chapin IP Law, LLC; Barry W. Chapin, Esq.

(57) ABSTRACT

A client application interface, or toolkit, provides a specified, exposed set of software components, or objects, for external user access. Development of a common interface for external user applications allows a remote access object model to define the interface corresponding to a base object model. The remote access object model, therefore, defines a generic toolkit upon which a user builds a custom application to suit individual remote access needs. Development of a single remote access object model limits regressive testing and provides a known baseline of tested functionality for the remote interface without compromising the existing base object model. Limited exposure of the objects in the client application interface avoids security, integrity, and inconsistency breaches. Therefore, the client application interface is operable to support the client application to emulate a specified exposure of a network administration and management application operations and functions via the remote access object model, or library.

13 Claims, 11 Drawing Sheets

SYSTEM AND METHODS FOR DEPLOYING AND INVOKING A DISTRIBUTED OBJECT MODEL

BACKGROUND OF THE INVENTION

In a conventional managed information system, such as a storage area network (SAN) operable to coordinate access to mass storage devices by a set of users, the network (SAN) interconnects a plurality of conventional mass storage device nodes and related hardware and/or software components, collectively referred to as manageable entities. The storage area network includes a variety of such manageable entities for providing mass storage retrieval services to users, such as storage devices (e.g. disc drive arrays), connectivity devices (e.g. switches and routers), and conventional host computers for executing software components called agents for monitoring and controlling the manageable entities (nodes) in the storage area network. The resultant infrastructure, therefore, for monitoring and controlling the storage area network, defines a complex array of nodes and interconnections.

In a conventional storage area network, a network management application includes a control center application for managing the manageable entities in the storage area network. The control center application includes a server for interrogating and manipulating the manageable entities, and a console having a graphical user interface (GUI) for operator/user interaction. In a typical conventional storage area network, the manageable entities may occupy a common site, such as a raised floor machine room. Accordingly, the control center server and console typically occupy adjacent locations so as to minimize latency and interconnection.

The conventional control center provides substantial monitoring and control ability of the manageable entities. Therefore, it is desirable to assign privileges to potential users such that potentially damaging or intrusive operations are limited to a subset of users. Accordingly, a typical conventional storage area network limits control center access to privileged operators having substantial knowledge of the SAN infrastructure. Management access to the control center and manageable entities is limited to the group of experienced SAN operators. Access by other, more infrequent or less experienced users, is either restricted or limited to a benign subset of control center operations and functions.

However, as the control center is proximate to the corresponding manageable entities, operator presence is required to manipulate sensitive and/or privileged SAN operations. Staffing issues of such privileged operators may interfere with off hours manipulation of SAN operations. If privileged operations are needed to support mission-critical efforts, on-site operator presence is required or productivity may suffer from the time lag required to locate a privileged operator.

In a management application such as the control center, selective remote access may be employed to provide timely, pinpointed support for unexpected and/or off hours needs. Further, less privileged remote access may be desirable for users requiring only benign operations, such as read-only queries. However, typical conventional management applications are built on a relatively large object (e.g. software component) model, or library. Such object libraries typically include large numbers of software components in source languages such as C, c++, JAVA®, HTML, and others. Accordingly, remote access raises issues of portability and resource capability from at the remote location. Further, the notion of multiple concurrent users presents blocking and semaphore issues to maintain integrity and avoid potential corruption. Also, a duplicate or parallel system creates code maintenance and consistency issues between the multiple versions of the application.

SUMMARY

In a typical management application for a conventional managed information network such as a storage area network, users desire flexible, remote access to the management application, yet expect and require maintaining integrity, security, and consistency. A vendor providing the conventional management application, such as a storage area network control center application, has a need to satisfy customer requests for remote access, yet a converse need to balance complexity and integrity of the base object library defining the conventional management application.

In other words, substantial extensions to the conventional base object library in response to various customer requests increases overall software complexity, and accordingly, drives up maintenance costs. Further, such extensions increase the risk associated with regressive tests, such as concurrency, locking and integrity for supporting multiple and/or remote users.

It would be beneficial, therefore, to provide a client application interface, or toolkit, to a specified, exposed set of software components, or objects, for external user access. Development of a common interface for external user applications allows a remote access object model to define the interface corresponding to a base object model. The remote access object model, therefore, defines a generic toolkit upon which a user builds a custom application to suit individual remote access needs. Development of a single remote access object model limits regressive testing and provides a known baseline of tested functionality for the remote interface without compromising the existing base object model (management application). Limiting the exposure of the objects accessible via the client application interface avoids security, integrity, and inconsistency breaches caused by improper invocation of objects in the remote access object model. In this manner, the management application is operable to support a client application to emulate a specified exposure of a network administration and management application operations and functions via the remote access object model (library).

In a typical user application, a user interacts with a server to produce particular application results. In a managed information system, such as a storage area network application, a user console interacts with the server to produce particular responses to data queries and entity manipulations, for example. The user console receives user input, passes the input to the server which processes the input, interfaces with a database or other entity within the storage area network, performs the desired operations, and reports the results back to the user via the console.

A base object library contains the software components, or objects, for providing the operations for manipulation of the storage area network. The user console invokes, via the local API, particular native objects from the base object library for accessing the operations in the base application server. Such a user console often interacts between the user and the base application server via a local, dedicated interface such as a LAN interconnection or a static coupling via a desktop computer. The native objects perform the corresponding operations, including functions such as database fetches, message passing to manageable entities, and processing a user result. The native objects then report the user results back to the local API via the dedicated static coupling for observation by the user.

The user console invokes the base object library in the server to access an object or set of objects for producing the desired result. Often, however, it may be desirable to access the operations in the server through an alternate path, such as a remote interface. The remote interface provides a parallel client application interface to the local API accessible via the user console. The remote interface therefore provides access to the base object library via a remote access object library for performing operations on the base application server, such as queries and manageable entity manipulation.

Embodiments of the invention are based, in part, on the observation that remote access object library instantiations tend to consume substantial memory by making duplicate copies of a set of related objects, increase opportunity for inconsistency and integrity compromise by having multiple, parallel objects, and involve subsequent processing of the copied objects in order to effect changes and operations in the base application server. For example, a user organization (i.e. corporation) establishes a storage area network to manage the storage arrays (i.e. disc drive arrays) containing its data. The storage arrays are located in a raised floor area (i.e. machine room) at the corporate headquarters site. The user console is co-located in an adjacent room. The corporation desires to allow the system operator to query the storage area network remotely for performing diagnostic queries and for observing off-hours activity and performance during backup operations. Accordingly, the user organization develops a back-end GUI client application interface to allow the operator an Internet connection to the base object library. Further, for security reasons, the client application interface does not allow full operational control of the storage area network, but rather exposes a subset of diagnostic and performance based queries for accessibility via the client application interface.

Often, a developer or user applies a remote access interface to an existing platform or application for providing access from an alternate control point. One approach is to produce a new interface by merely copying an entire existing object library and modifying a few lower level transport functions to access the base application server and to look to a different user output device for transmitting input and output to the user. In such conventional approaches, an object model is provided as a parameter to a service, rather than employing the same object model concurrently and constantly on both sides of the link.

This approach, however, has the effect of redundantly duplicating the objects in the base application object library when accessed via the remote access interface. Such duplication consumes substantial memory, is inefficient, and introduces the opportunity for access conflicts, inconsistency and corruption by establishing duplicate objects without robust mutual exclusion, locking, and semaphore structures in place. Further, such a duplication approach makes no provision for avoiding exposure of security sensitive or privileged objects, possibly allowing a remote user inappropriate or potentially damaging accessibility into the base application server.

It would be beneficial, therefore, to provide a client application interface which allows a client to develop a client application, such as a toolkit, for remote access to the server via the base application object library that provides direct reference linkage to corresponding objects in the base object library, and which also allows for limited exposure of a subset of objects so as to limit potentially damaging access. Embodiments of the invention substantially overcome particular shortcomings of the above described conventional methods by providing a remote access object library accessible by a client application interface. The remote access object library discussed herein provides remote instantiation of objects in the remote access object library that have a direct reference linkage to counterpart native objects in the base application object space. A client application interface specifies a certain subset of objects in the base object library for inclusion in the remote access object library, therefore limiting exposure at compile time and access at runtime.

The objects in the base application library, therefore, are selectively exposed via counterparts in the remote access object library. Accordingly, only a subset of the objects are available in the remote access object library. Invocation of an object in the remote access object library via the client application interface results in an dynamic reflection, or instantiation, of an object in the remote access object library. In response to the invocation, the remote access object library instantiates an API object in a client object space having a direct reference linkage to a counterpart native object in a base application object space. Therefore, operations performed on the API object cause a corresponding change, via the dynamic reference linkage, to the counterpart native object. In this manner, the API object results in changes to the object itself at the base application object space, not merely changes to a duplicate copy which the remote application must subsequently propagate to a "live" base application object space.

In further detail, remote invocation of an object in a base object library via a remote access object library, as disclosed herein, involves invoking an API object reference in the remote access object library via a client application interface including the reference. The API object reference is used for identifying a corresponding native object to the invoked API object reference in the base object library, and is also used for instantiating the identified native object as an API object in a client object space on the client computer system. The native object and the API object are linked by a unique object identifier which is used to maintain the link between the instantiated API object and the corresponding native object, such that the link therefore provides a dynamic reflection of the native object in the API object.

The server instantiates the API object using the native object and the object identifier by copying the identified native object in a base application object space on the server computer system. The server identifies a set attributes of the native object, and a corresponding set of attributes in the copied object. From the identified attributes of the native object, the server determines attribute values of the corresponding instantiated API object from metadata defining the remote access object library, and populates the corresponding attributes in the instantiated API object.

Maintaining the link between the API object and the native object involves referencing, in a realtime manner, the native object in response to operations to the instantiated API object. Such referencing includes identifying the native object via the object identifier to uniquely identify an instantiation of the native object in a base application object space such that the operations produce a nonduplicative, atomic result in the native object via the instantiated API object.

In a particular configuration, the link allows traversal of objects in the remote access object library by invoking a traversal method in the API object in the remote access object space, and identifying the corresponding native object in the base application object space using the object identifier. The traversal then determines a related object associated with the native object in the base object library using a traversal service, and receives an instantiation of the related object via the traversal service and the object identifier. The related object corresponds to the association to the native object in the base object library, in which the association is indicative of class relationships between the objects. The instantiation is received from a copied object of the related object, in which the instantiation maintains a dynamic link to the related object.

In another particular implementation, base object library includes exposed objects and local objects, in which the exposed objects have a corresponding native object in the object model. The exposed objects are operable to provide similar operations via the remote application interface as the corresponding native object performs in the base application object space. Invocation of an object includes determining an exposure attribute of the object to indicate whether the invoked object is an exposed object.

Deployment of the API server involves providing the remote access object library and the client application interface, including identifying a set of templates corresponding to object types in the base application library. The object types correspond to context specific (i.e. server side or client side, for example) operations for providing the remote API. For each of the object types, metadata is defined for each of the objects in the remote API, in which the metadata identifies the runtime behavior the each of the exposed objects. Using the set of templates and the metadata, an API object generator builds the exposed objects in the remote access object library for invocation by the client application.

In other arrangements, links between the objects in the remote access object library are maintained to the native objects upon modifications to the server object library. Accordingly, the remote access interface can remain unmodified so as to avoid disrupting and recompiling or rebuilding existing clients of it. This is done by modifying the remote access object library to remap the interface elements to their new counterpart native objects in the base application object library (server OM) invisibly to the client application.

In particular alternate configurations, the base object library defines a native application for providing managed information network services to users. The managed information network may be a storage area network management application having a database of storage area network management information. The storage area network management application is operable to manipulate agents corresponding to manageable entities, in which case the remote access object library operates as a user accessible toolkit. The toolkit is operable to provide API entry points, such as for access by a user defined application, into the storage area network management application in a nonintrusive manner for interrogating the SAN agents and the corresponding database. In a particular exemplary implementation, the network is a collection of nodes including manageable entities responsive to the server in a SAN and further includes storage entities, connectivity entities, and database entities.

The invention as disclosed above is described as implemented on a computer operable for deploying software object components according to an object oriented language, and having a processor, memory, and interface operable for performing the steps and methods for monitoring an information services network system as disclosed herein. Other embodiments of the invention include a computerized device such as a computer system, central processing unit, microprocessor, controller, electronic circuit, application-specific integrated circuit, or other hardware device configured to process all of the method operations disclosed herein as embodiments of the invention. In such embodiments, the computerized device includes an interface (e.g., for receiving data or more segments of code of a program), a memory (e.g., any type of computer readable medium), a processor and an interconnection mechanism connecting the interface, the processor and the memory. In such embodiments, the memory system is encoded with an application having components that when performed on the processor, produces a process or processes that causes the computerized device to perform any and/or all of the method embodiments, steps and operations explained herein as embodiments of the invention to allow execution of instructions in a computer program such as a Java, HTML, XML, C, or C++ application. In other words, a computer, processor or other electronic device that is programmed to operate embodiments of the invention as explained herein is itself considered an embodiment of the invention.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, with emphasis instead being placed upon illustrating the embodiments, principles and concepts of the invention.

DETAILED DESCRIPTION

Figure 1:
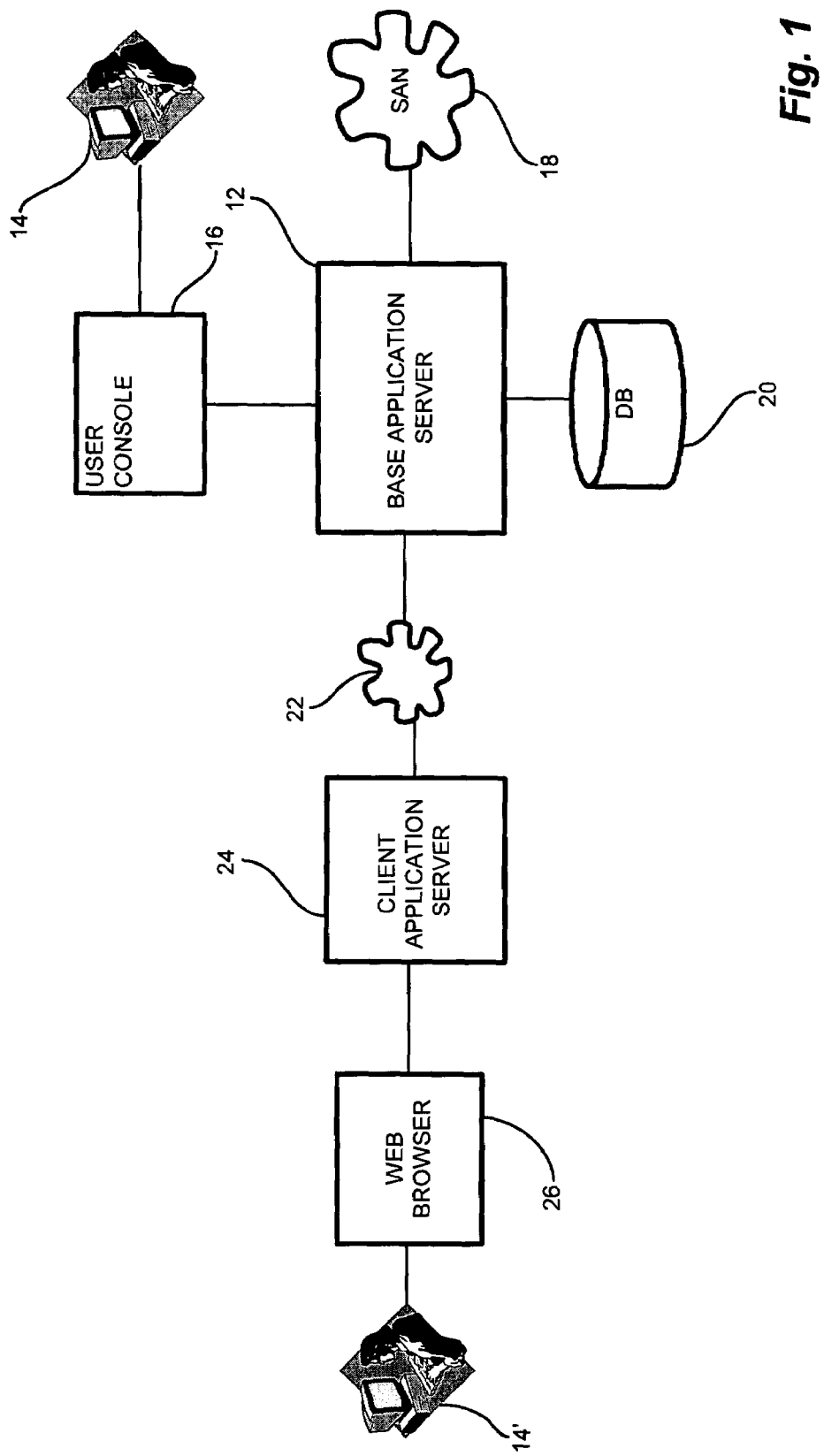
FIG. 1 shows a context diagram of a managed information system management application as discussed herein with respect to the present invention.

In a network management and control system, the disclosed remote access client application interface includes a set of software components, or objects, operable for external user access. Development of a common interface for external user applications allows a remote access object model to define the interface corresponding to an existing base object model, or library. The remote access object model, therefore, defines a generic toolkit upon which a user builds a custom application to suit individual remote access needs. Development of a single remote access object model limits regressive testing and provides a known baseline of tested functionality for the remote interface without compromising the existing base object model, such as the exemplary storage area network management application discussed herein. Limiting the exposure of the objects in the accessible via the client application interface avoids security, integrity, and inconsistency breaches caused by improper invocation of objects in the remote access object model. In this manner, the management application is operable to support a client application to emulate a specified exposure of a network administration and management application operations and functions via the remote access object model, or library.

The preexisting base object library, upon which the remote access object library interface relies, contains the software components, or objects, for providing the operations for manipulation of the storage area network. The user console invokes, via the local API, particular native objects from the base object library for accessing the operations in the base application server. Such a conventional user console often interacts between the user and the base application server via a local, dedicated interface such as a LAN interconnection or a static coupling via a desktop computer. The native objects perform the corresponding operations, including functions such as database fetches, message passing to manageable entities, and processing a user result. The native objects report the user results back to the local API via the conventional, dedicated static coupling for observation by the user.

The conventional user console, therefore, invokes the base object library in the server to access an object or set of objects for producing the desired result. Often, however, it may be desirable to access the operations in the server through an alternate path, such as a remote interface. The remote interface provides a parallel client application interface to the local API accessible via the user console. The remote interface therefore provides access to the base object library via a remote access object library for performing operations on the base application server, such as queries and manageable entity manipulation. Embodiments of the invention are based, in part, on the observation that remote access object library instantiations tend to consume substantial memory by making duplicate copies of a set of related objects, increase opportunity for inconsistency and integrity compromise by having multiple, parallel objects, and involve subsequent processing of the copied objects in order to effect changes and operations in the base application server.

In other words, in such conventional approaches, an object model is provided as a parameter to a service, rather than employing the same object model concurrently and constantly on both sides of the link. Such conventional approaches do not have the benefit of reusing the same instances over time, thereby avoid duplication by not creating additional copies of the remote access object library model upon each invocation of a service.

The disclosed client application interface allows a client to develop a client application such as a remote toolkit for access to the server via the base application object library. The client application interface provides direct reference linkage to corresponding objects in the base object library, and also provides for limited exposure of a subset of objects so as to limit potentially damaging access. Embodiments of the invention substantially overcome particular shortcomings of the above described conventional methods by providing a remote access object library accessible by a client application interface which provides remote instantiation of objects in the remote access object library that have a direct reference linkage to counterpart native objects in the base application object space. A client application interface specifies objects in the base object library for inclusion in the remote access object library, therefore limiting exposure at compile time and access at runtime.

The objects in the base application library, therefore, are selectively exposed via counterparts in the remote access object library. Accordingly, only a subset of the objects are available in the remote access object library. Invocation of an object in the remote access object library via the client application interface results in an dynamic reflection, or instantiation, of an object in the remote access object library. In response to the invocation, the remote access object library instantiates an API object in a client object space. The instantiated object has a direct reference linkage (link) to a counterpart native object in a base application object space. Therefore, operations performed on the API object cause a corresponding change, via the dynamic reference linkage, to the counterpart native object. In this manner, the API object results in changes to the corresponding object at the base application object space, not merely changes to a duplicate copy which the remote application must subsequently propagate to a "live" base application object space.

FIG. 1 shows a context diagram of a managed information system management application as discussed herein with respect to the present invention. Referring to FIG. 1, a computer system 10 includes a base application server 12, a user console 16 in communication with a user 14, a managed network 18, such as a storage area network (SAN), responsive to the base application server 12, and an application database 20. The network further includes a remote client application server 24, connected to the base application server 12 via a remote interface 22. A remote user 14' is in communication with the client application server 24 via a user interface device 26, such as a web browser PC, console, or other input/output device, e.g. laptop, personal digital assistant (PDA), wireless phone, etc. The remote interface 22 may be via a public access network such as the Internet, a wireless interface, or a dialup modem connection, for example. The remote interface may further incorporate particular security aspects, such as firewalls, encryption, and tunneling protocols.

In accordance with particular configurations of the invention, discussed further below, the client application server 24 allows a remote user 14' to interact with the base application server 12 over the remote interface 22. The remote interface 22 may be a public access network such as the Internet, or other transport medium. The remote user 14' employs a browser or other user interface on the user interface device 26 to manipulate the database 20 and managed network 18 in a manner emulating control available via the local console 16 to a local user 14.

Figure 2:
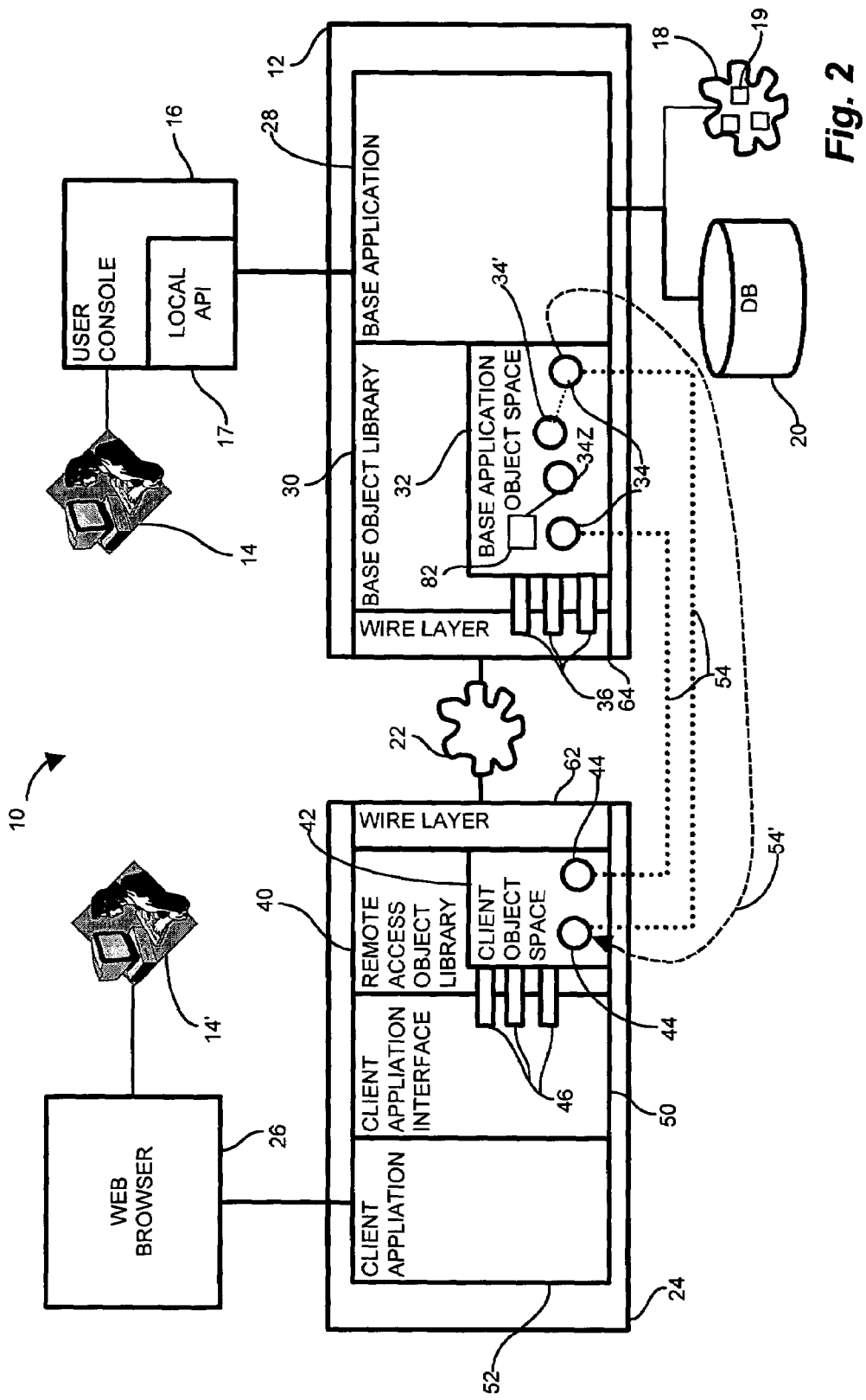
FIG. 2 is a block diagram of a computer system operable to execute the application in FIG. 1 and suitable for use with a particular configuration of the invention as defined herein.

FIG. 2 is a block diagram of a computer system 10 operable to execute the application in FIG. 1 and suitable for use with a particular configuration of the invention as defined herein. Referring to FIG. 2, the base application server 12 includes a base application 28, a base object library 30 having a base application object space 32, native objects 34 operable for execution in the base application object space 32, and adapters 36 for access from remote interfaces, discussed further below. The base application server 12 connects to the user console 16 via a local API 17, and is also connected to an application database 20 and a storage area network 18, including manageable entities 19 responsive to the base application 28.

The client application server 24 includes a client application 52, a client application interface 50, and a remote access object library 40. The remote access object library 40 includes a client object space 42 operable to execute API objects 44, and API object references 46 to the API objects 44. The client application server 24 also includes a wire layer interface 62 for transport between a wire layer interface 64 at the base application server 12, over the remote interface transport 22.

The remote interface transport 22 maintains dynamic links 54 between the API objects 44 in the client object space 42 and corresponding native objects 34 in the base application object space 32. The dynamic links 54 provide a realtime reflection of the native objects 34 in their counterpart API objects 44, effecting operations and functions performed on the API objects to the corresponding native objects 34. In this manner, a remote user 14' manages and manipulates the storage area network 18 entities 19 by accessing an API object 44 to effect a result on the corresponding native object 34 via the dynamic links 54, and subsequently to the SAN 18 entities 19 and database 20.

It may be illustrative to expand on the object libraries 30, 40 and the object spaces 32, 42. Runtime implementations of object oriented software systems, such as that encapsulated in the invention defined by the present claims, generally are expressible in terms of a compile time aspect and a runtime component. In such an object oriented system, an object exists as a compiled entity in a library. Each object has relationships to other objects by way of classes, common to those of skill in the art, referred to herein as "is a" and "has a" to denote subclasses. An object becomes instantiated, or executed, by the runtime aspect, which generally involves either an interpreter or a compiler, illustrated herein as a compiler/interpreter to denote the transition to the runtime aspect of the object in the object space 32, 42.

As discussed herein, the base object library 30 and the remote access object library 40 correspond to the compile time version of the objects, and represent the objects and class relations in a passive form. The base application object space 32 and the client object space 32 correspond to a runtime version, or component, of the object, which may exists as multiple instantiations of the object. Therefore, the object spaces 32, 42 represent the memory space operable to store and execute runtime objects, as will be discussed further below.

Figure 3:
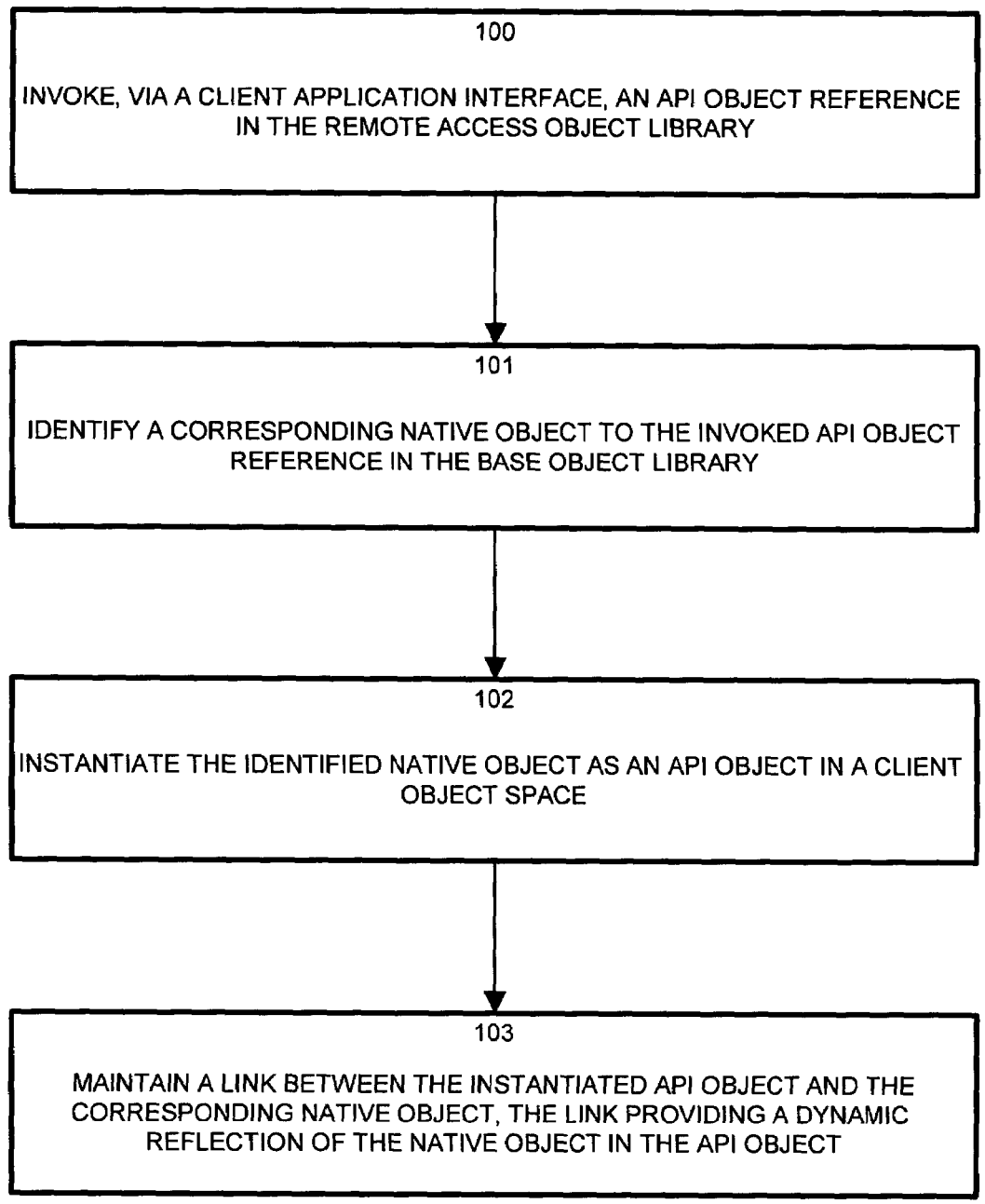
FIG. 3 is a flowchart showing deploying and invoking the distributed object model as defined herein.
Figure 4:
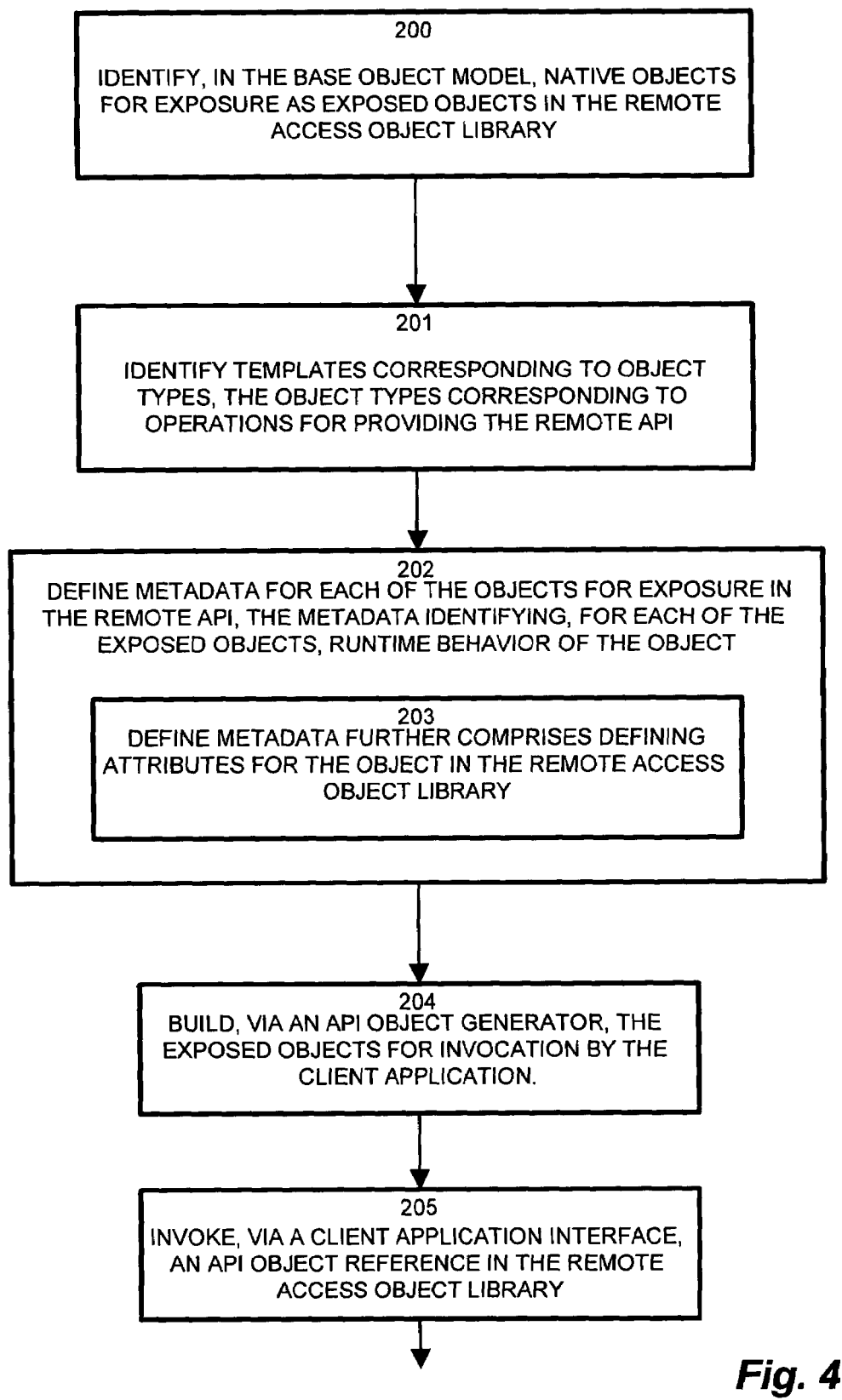
FIGS. 4-6 are a flowchart showing deploying and invoking the distributed object model in further detail.
Figure 5:
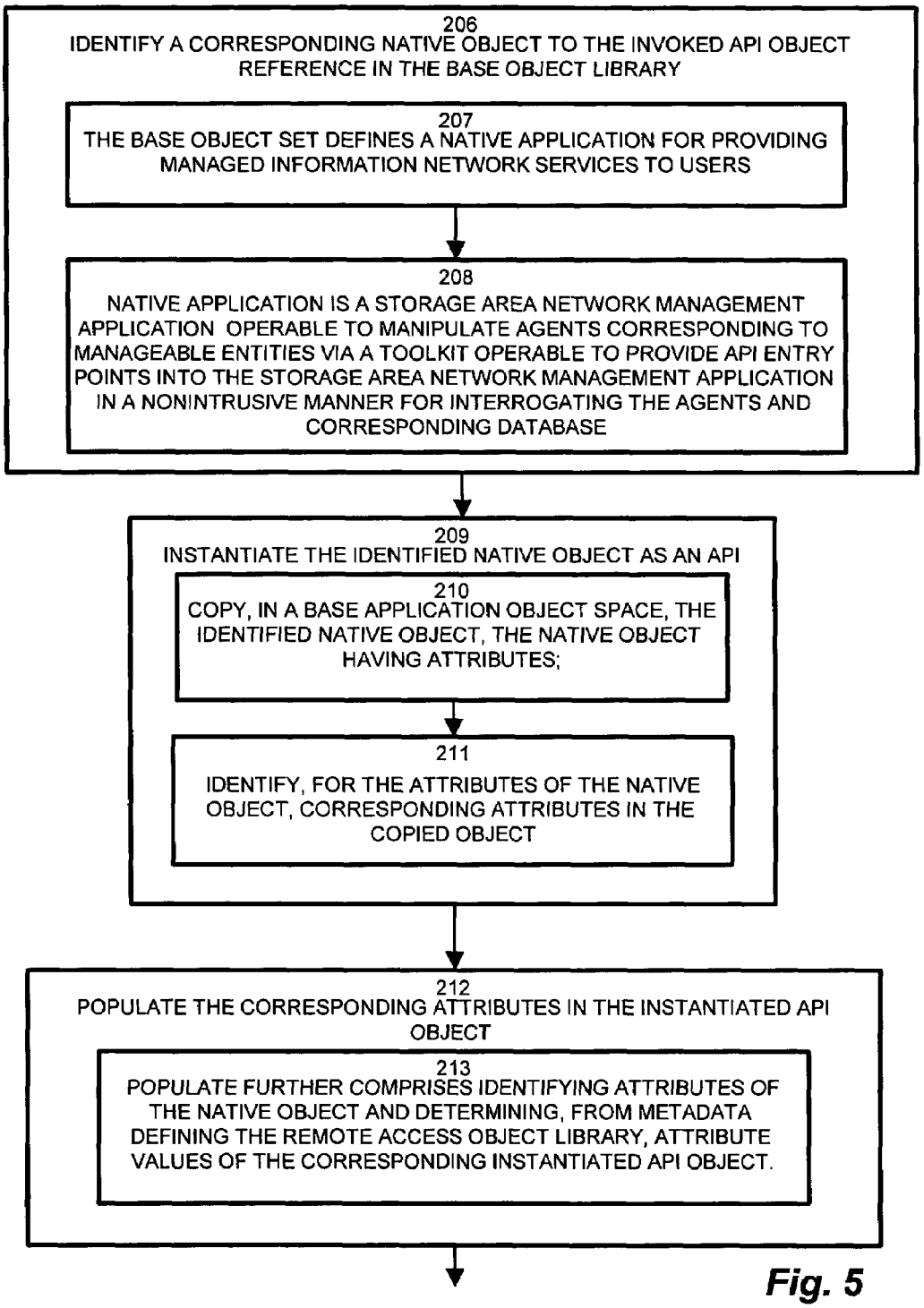
Figure 6:
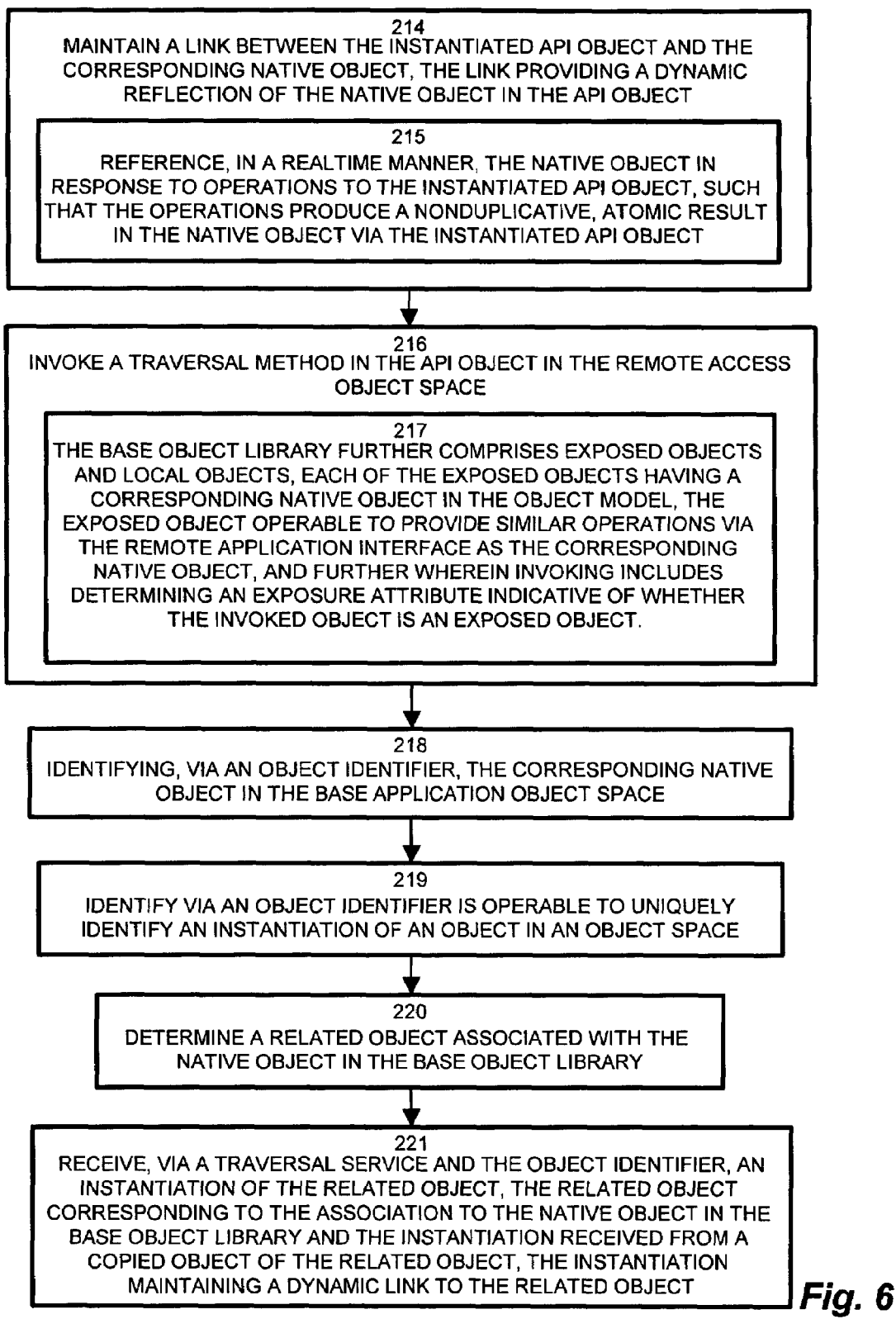

FIG. 3 is a flowchart showing deploying and invoking the distributed object model as defined herein. Referring to FIGS. 2 and 3, features of the method for remote invocation of an object in the base object library by use of the remote access object library are shown. FIGS. 4-6 below disclose the method of FIG. 3 in greater detail, and FIG. 10 below describes the initial generation of the remote access object library prior to deployment. At step 100, a client application 52 invokes an API object reference 46 in the remote access object library 40 via the client application interface 46. At step 101, the base application server 12 identifies a native object 34 corresponding to the invoked API object reference 46 in the base object library 30. At step 102, the client server 24 instantiates the identified native object 34 as an API object 44 in the client object space 42. At step 103, the base application object space 32 maintains a 54 link between the instantiated API object 44 and the corresponding native object 34. The link 54 provides a dynamic reflection of the native object 34 in the API object 44, such that operations and changes to the API object 44 effect concurrent and similar changes to the counterpart native object 34 via the link 54, rather than merely changes to an unlinked object copy.

FIGS. 4-6 are a flowchart showing deploying and invoking the distributed object model in further detail. Referring to FIGS. 2 and 4-6, at step 200, a requirements instance manager identifies native objects 34 in the base object library 32, or model, for exposure as exposed API objects 44 in the remote access object library 40. The exposed objects 44 are those objects which are visible to the client application 52 via the client application interface 50. The client application interface 50 includes API object references 46 operable to invoke the exposed API objects 44 (API objects). Unexposed objects have no such corresponding API reference 46. Therefore, the developer of the remote access object library 40 selectively limits operations and functions available through the client application interface 50 by omitting API object references 46 to disallowed functions.

At step 201, from among the selected set of objects for exposure via the remote access object library 40 and the client application interface 50, an architecture mapper (104, discussed further below with respect to FIG. 9) identifies templates corresponding to object types. For each of the exposed objects 44, certain methods associated with those exposed objects 44 are executable, or invokable, from different contexts. The template object types correspond to operations, or methods, for providing the remote API. For example, a particular object may have methods invokable from the server side and methods invokable from the client side. The templates define these and other contexts for invoking the object.

At step 202, the requirements instance manager defines metadata 106 for each of the objects 44 for exposure in the remote client application interface 50. The metadata identifies the runtime behavior, or available methods, for each of the exposed API objects 44. At step 203, the metadata further defines attributes for the objects in the remote access object library 40. Each of the API objects 44 has attributes, including class and subclass relations to other objects, object identifier key information, and delayed or immediate translation, discussed further below.

At step 204 a build facility (100, discussed below), such as a computer system having a compiler or interpreter, builds the exposed objects for invocation by the client application, also discussed further below. At step 205, the resultant remote access object library 40 is operable for invocation via the client application interface 50. A client application 52 invokes the API object reference 46 to the remote access object library 40. At step 206, the remote access object library 40 identifies a corresponding native object 34 to the invoked API object reference 46 in the base object library 30. The remote access object library 40 employs an adapter 36 corresponding to the native object 34, using an object identifier in an object mapping table 82, discussed further below.

At step 207, identification of the native object 34 occurs in a base object set which defines a native application for providing managed information network services to users 14, 14'. At step 208, such a native application is a storage area network management application having a database of storage area network management information, the storage area network management application operable to manipulate agents corresponding to manageable entities, and wherein the remote access object library is a toolkit operable to provide API entry points into the storage area network management application in a nonintrusive manner for interrogating the agents and corresponding database.

At step 209, the client application server 24 instantiates the identified native object 34 as an API object 44. The instantiation includes establishing the link 54 between the native object 34 and the API object 44. At step 210 the server 12 copies the identified native object 34' in the base application object space 32. At step 211, the client application server 24 identifies the attributes of the copied object 34' corresponding to the attributes of the native object 34.

At step 212, the client application server 24 populates the corresponding attributes in the instantiated API object 44 using the metadata 106. At step 213, populating the API object 44 attributes includes identifying attributes of the native object 34 and determining, from the metadata 106 defining the remote access object library, attribute values of the corresponding instantiated API object 44. As indicated above, the metadata defines attributes such as related object class dependencies (i.e. IS A and HAS A), translation of the related objects (immediate or delayed), and others, discussed further below.

At step 214, the client object space 42 copies the object 34' and establishes a link 54 between the instantiated API object 44 and the corresponding native object 34, as shown by dotted line 54'. The native object 34 has an object identifier in the object mapping table 82, which the API object 34 employs such that the link provides a dynamic reflection of the native object 44 in the API object 34. At step 215, the client object space maintains the link by referencing the native object 34 in realtime in response to operations to the instantiated API object 44, such that the operations produce a nonduplicative, atomic result in the native object via the instantiated API object 44. Therefore, changes and modifications made to the API object affect the native object 34 in the same manner, rather than as a duplication of objects or components which may be subject to periodic copying and a time lag of inconsistency.

At step 216, the API object 44 attempts to invoke a method which invokes a related object, which therefore causes a traversal from one object to a related, object according to the object classes in the base object library 30. Accordingly, the API object invokes a traversal method via an adapter 46 in the remote access object space 40.

At step 217, The traversal further distinguishes exposed objects and local objects from the base object library 30. The exposed objects 44 having a corresponding native object 34 in the base object library, in which the exposed object 44 is operable to provide similar operations via the remote client application interface 50 as the corresponding native object 34. Typically, the build facility determines exposed objects 44 at compile time by determining an exposure attribute indicative of whether the invoked object is an exposed object. Accordingly, an unexposed object does not have a corresponding API (exposed) object or API object reference 46, so an attempt to invoke such an unexposed object fails.

At step 218, the application server 24 identifies the corresponding native object 44 in the base application object space 32 via the object identifier. At step 219, the object identifier is a unique identifier, or key, operable to uniquely identify an instantiation of the object 44 in the base application object space 32 via a lookup in the object mapping table 82. The lookup in the table provides the reference (i.e. address, or location in the base application object space 32) of the traversal object.

At step 220, the lookup record also provides the identity of a related object associated with the native object in the base object library. The application server 24 receives via the name mapping, or traversal, service and the object identifier, an instantiation (API object) 44 of the related object 34. The instantiated, related object 44 corresponds to the association to the native object 34 in the base object library 30 and the instantiation received from a copied object 34' of the related object 34. As with the traversing "parent" object, the instantiated API object 44 maintains a dynamic link 54 to the related object 44. The traversal and instantiation of related objects is discussed further below with respect to FIGS. 7 and 8.

Figure 7:
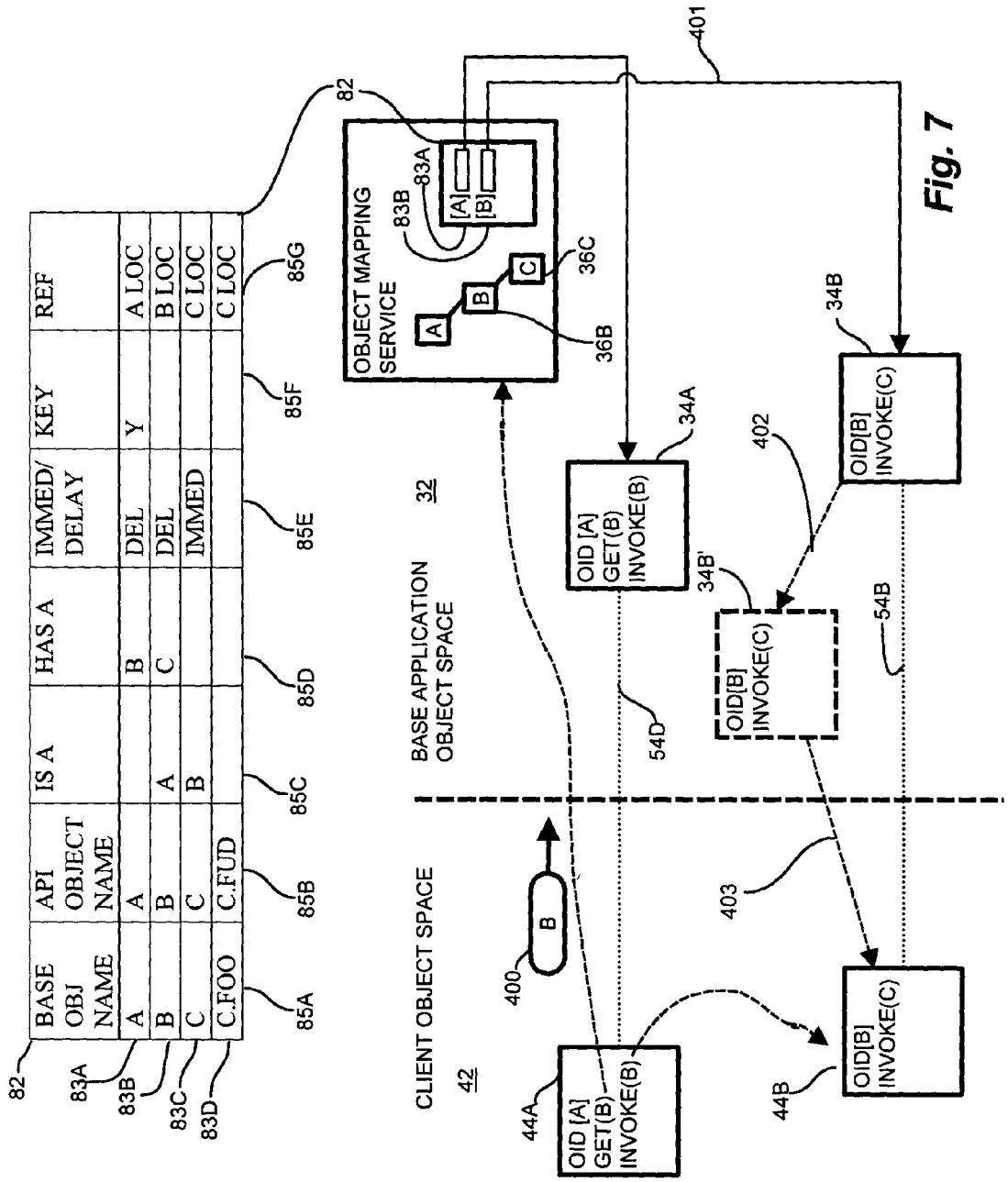
FIGS. 7 and 8 show an example of invoking an object via the client application interface.
Figure 8:
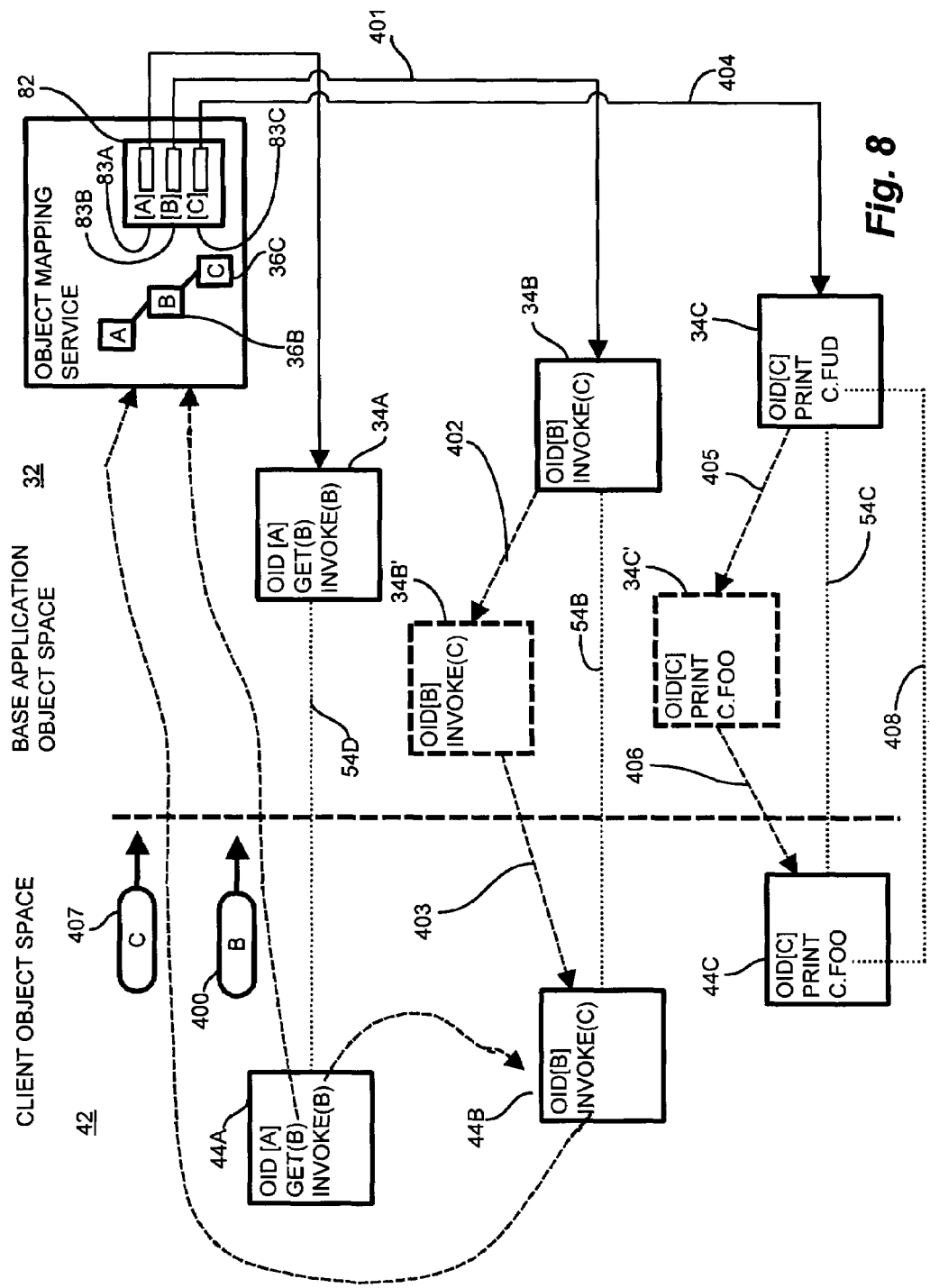

FIGS. 7 and 8 show an example of invoking an object via the client application interface. Referring to FIGS. 2, 7, and 8, object 44A (A) executing in the client object space 32 invokes object B by referencing the corresponding adapter 36B by object name "B", in the base application object space 32, as shown by message 400. The base application object space 32 employs a mapping service object 36Z and receives the invocation message 400 via the adaptor 36A.

The mapping service object 36Z is operable to map the object name in the invocation message 400, and is responsive to the adaptors 36 and to the object mapping table 82 for determining related objects (classes). The object mapping service 36Z is an exemplary mechanism for correlating the API objects 44 and the native objects 34 over the links 54. Alternate implementations may employ other object management mechanisms.

In response to the invocation message 400, the mapping service object 34Z triggers instantiation of a corresponding native object 34B. The mapping service object 36Z, therefore, maintains a reference identifier and location for each native object 36 via the mapping table 82.

The mapping service object 36Z, therefore, in the exemplary implementation shown, maintains the object table 82 for mapping object names, object identifiers, and location references. The object mapping table 82 includes columns for native object names 85A, API object names 85B, and location references 85G of the objects 34 within the base application object space 32. The object mapping table 82 also maintains other attribute information, such as delayed or immediate instantiation 85E, object identifier key fields 85 F, and class inheritance relations 85C, 85D.

Upon instantiation of a new object 32, the mapping service object 34Z creates an entry 83B in the table 82 for the new native object 34B, as shown by arrow 401. In order to generate the dynamic reflection of the object via a link 54, the base application object space 32 first instantiates a temporary copy 44B' of the object native 34B (B), as shown by arrow 402. The client API sever 24 then copies the object 44B' to the client object space 42, as shown by arrow 403.

Referring to FIGS. 7 and 8, note that the object C (82C) has an immediate translation attribute E. Therefore, instantiation of the native object 44B triggers the instantiation of native object 34C, as shown by arrow 404. As with object 44B, the base application object space instantiates a temporary copy 34C', as shown by arrow 405, and the client application server 24 copies the temporary object 44C' as the API object 44C, as shown by arrow 406.

Object then attempts to invoke object C, as a method referenced by object 44B. Accordingly, object 44B sends the message 407, including the object identifier C, to the mapping service object 34Z. The mapping service object 34A reads the object identifier C and maps the identifier into the object name table 82. From entry 83C, the mapping service object 34Z finds the location reference 85G of the native object 34C, thus maintaining the link 54C.

Object 44C executes a print method for C.FOO. Referring to the object mapping table 82, the API object C.FOO in entry 83C' at column 85A corresponds to native object attribute C.FUD at column 85B, as shown by dotted line 408.

Figure 9:
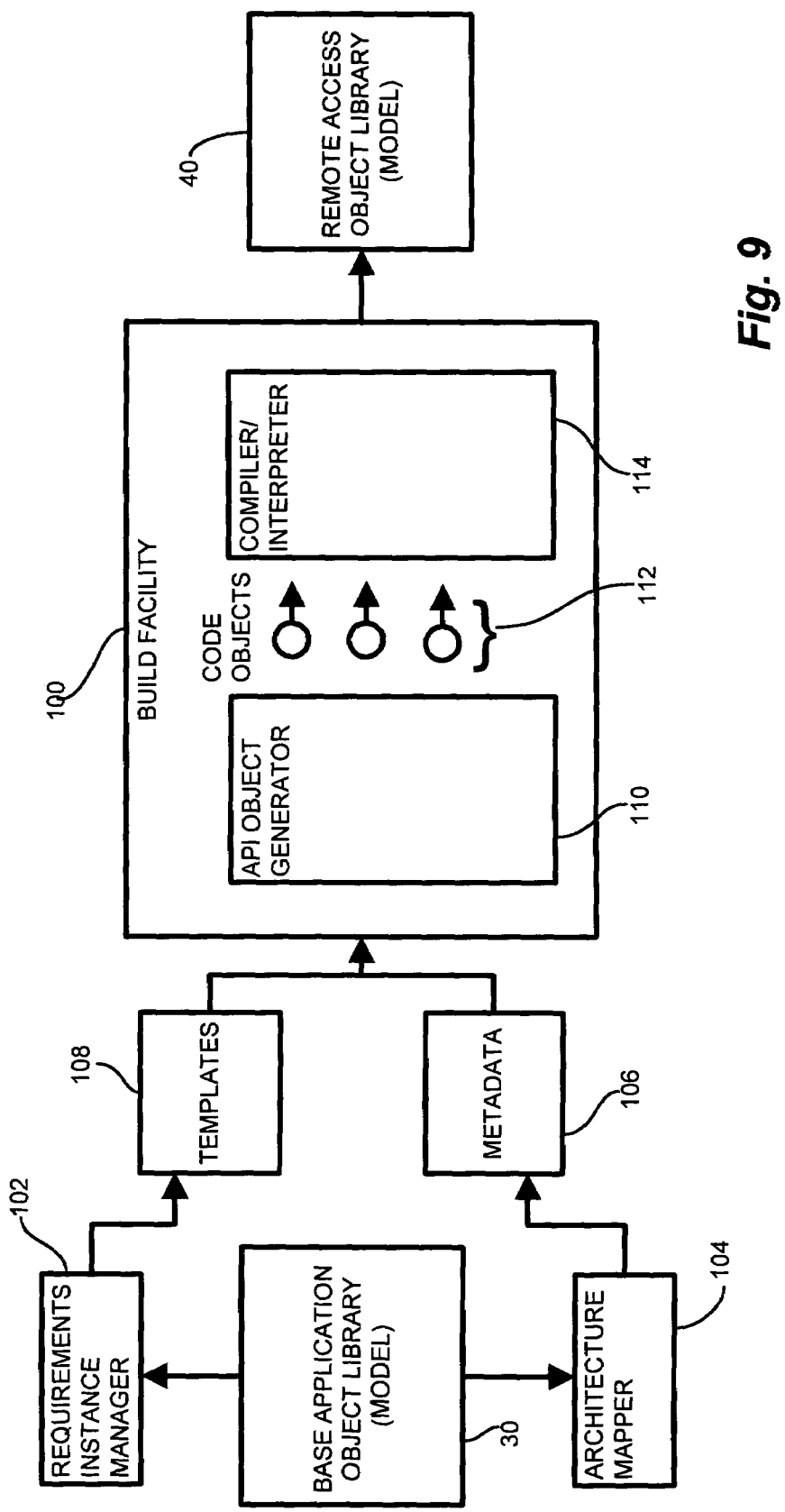
FIG. 9 shows a block diagram of deployment of a remote client application interface for deploying the distributed object model of FIG. 1.

FIG. 9 shows a block diagram of deployment of a remote client application interface for deploying the distributed object model of FIG. 1. Referring to FIGS. 2 and 9, a requirements instance manager 102 and an architecture mapper 104 are operable to receive input from the base object library 30, or object model. A build facility 100 includes an API object generator 110 receives metadata 106 from the requirements instance manager 102 and templates 108 from the architecture mapper 104. The API object generator 110 generates code objects 112, which are receivable by the compiler/interpreter 114. The compiler/interpreter generates the objects 44 to build the remote access object library 40 and client application interface 50 for use by the client application 52.

In operation, the base object library 30 includes a set of objects in source code form, and serves as the object model for the resulting remote access object library (remote API). The requirements instance manager 102 identifies, based on software or functional requirements, object specific attributes for the remote access objects 44 in the remote access object library 40. Such attributes include those shown in TABLE I, above, and may include others. The requirements instance manager 102 also defines exposure of objects, i.e. which objects to include in the remote access object library 40. The requirements instance manager, therefore, may require manual modifications and design effort, resulting in the metadata 106 which corresponds to each exposed object 44.

The architecture mapper 104 defines general instances of the object for inclusion in the remote access object library 40. The architecture mapper groups the included, or exposed objects 44, into groups of code templates corresponding to the deployment behavior of the objects. Such templates groups include the base application server side, a temporary object instantiation, a remote application client side, and translation code for invoking and referencing the corresponding client and server (base and remote) application objects. Other template groups are definable.

The API object generator 110 processes the templates 108 and metadata 106 to generate code objects 112. The code objects 112 are source code representations of each of the templates 108 correlated which each of the defined metadata 106 definitions for each exposed object. Therefore, the templates 108 receive attribute specifications from the metadata 106 to produce a resulting source code object. The code objects 112 are compilable or interpretable by the compiler/interpreter 114 into the set of objects 44 defining the remote access object library 40. Typically, each exposed object 44 for which the requirements instance manager 102 defines metadata generates a code object 112 for each of the templates groups 108 corresponding to the deployment context, as will now be discussed further with respect to FIG. 10.

Figure 10:
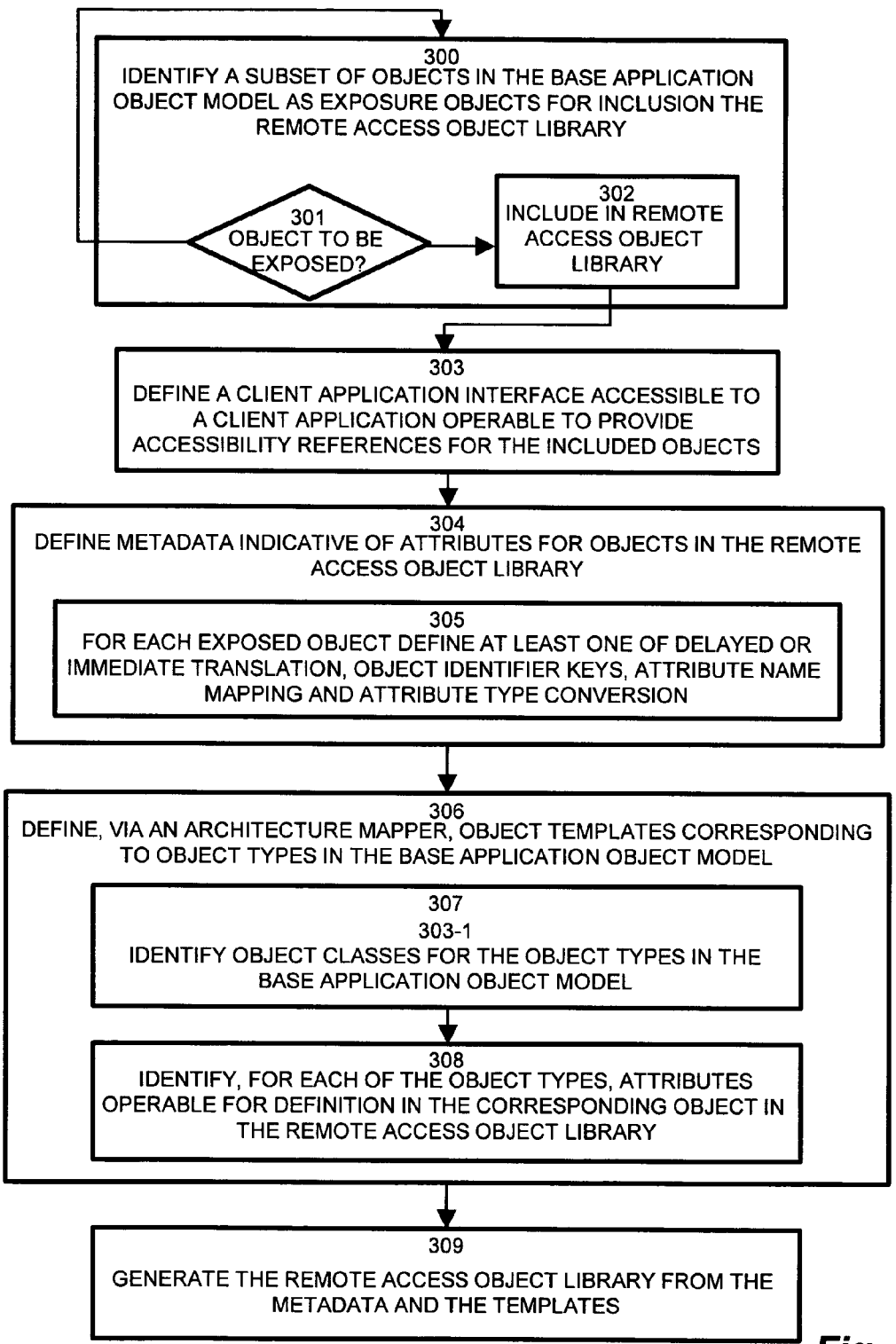
FIG. 10 shows a flowchart for deploying the remote client application as in FIG. 9.

FIG. 10 shows a flowchart for deploying the remote client application as in FIG. 9. Deployment refers to the compile time aspect described above. Referring to FIGS. 9 and 10, at step 300, the requirements instantiation manager 102 identifies a subset of objects in the base application object library 30 (model) as exposure objects 44 for inclusion the remote access object library 40. The requirements instantiation manager may be a operator driven inspection task, including identifying benign objects for exposure, or may, in alternate embodiments, be a more automated task, such as identifying objects which access or avoid access to sensitive data stores, for example.

At step 302, the requirements analysis manager performs an iterative analysis (check) of the objects 34 in the base application library to determine whether to expose the objects in the client application interface. If the object is to be exposed, then, at step 302, the object is include in the remote access object library 40 and the client application interface 50 by a API object reference 46 for the exposed, included object. At step 303, requirements instance manager defines the client application interface 50 accessible to a client application operable to provide accessibility references 46 for the included objects. The client application interface 50, therefore, includes a list of API object references 46, or entry points, for the objects 44 included in the remote access object library 40.

At step 304 the requirements instance manager 102 defines, for the exposed objects, metadata indicative of attributes for objects in the remote access object library. At step 305, for each exposed API object 44 and the corresponding native object in the remote access object library, the requirements instance manager defines attributes for the API object 44. In the particular configuration illustrated, the attributes corresponding to at least one of delayed or immediate translation, object identifier keys, attribute name mapping and attribute type conversion.

Delayed or immediate translation refers to whether the object 44 is instantiated when a related object, defined by the class relations by the "is a" and "has a" columns, is instantiated. Therefore, the client application server 24 instantiates immediate translation objects when a corresponding related object is instantiated, while the delayed objects are not instantiated until another object explicitly invokes them.

Object identifier keys refer to whether the attribute, or field, is included in the object identifier for uniquely identifying the object. As indicated above, the object identifier provides the dynamic link 54 since it uniquely distinguishes an object in the base application object space 32 as corresponding to a particular counterpart object in the client object space 44.

Attribute name mapping identifies corresponding attributes between counterpart objects in the base application object space 32 and the client object space. Mnemonic differences may exist between counterpart objects. Accordingly, the name mapping indicates which attribute values in an object 44 the client object space 42 correspond to particular object values in the base application object 34. The corresponding values remain consistent by copying via the dynamic link 54, thus maintaining the dynamic, reflective nature of the objects 44 in the client object space 42. The type conversion attribute is an extension of the name mapping, and specifies type conversions between counterpart attributes.

At step 306, the architecture mapper defines object templates 108 corresponding to object types in the base application object library (model). The native objects 34 define object groups depending on the deployment context. For example, an instantiation of an object 34 on the server 12 may have different context specific requirements than the client 24 side counterpart. The templates 108 define a general framework, or object definition, for receiving the attributes. At step 307, the architecture mapper 104 first identifies a set of object classes for the object types in the base application object model. Each context specific object type (i.e. having a template), therefore, now has a defined class type. At step 308, the architecture mapper identifies the attributes operable for definition in the corresponding object in the remote access object library for each of the object types (classes), resulting in a template for each object type.

At step 309, the API object generator 110 generates code object 112 from the metadata 106 and templates 108 by populating each template type (i.e. object type) for each object defined in the metadata 106. Therefore, the API object generator 110 generates a set of code objects 112 of each template type for each of the exposed API object 44 included in the client remote access object library 40. The API object generator 110, therefore, generates, the remote access object library 40 from the metadata 106 and the templates 108. As discussed above, each of the code objects 112 in the remote access object library 40 are operable for instantiation via the compiler/interpreter into executable objects 34 in the client object space 42.

Figure 11:
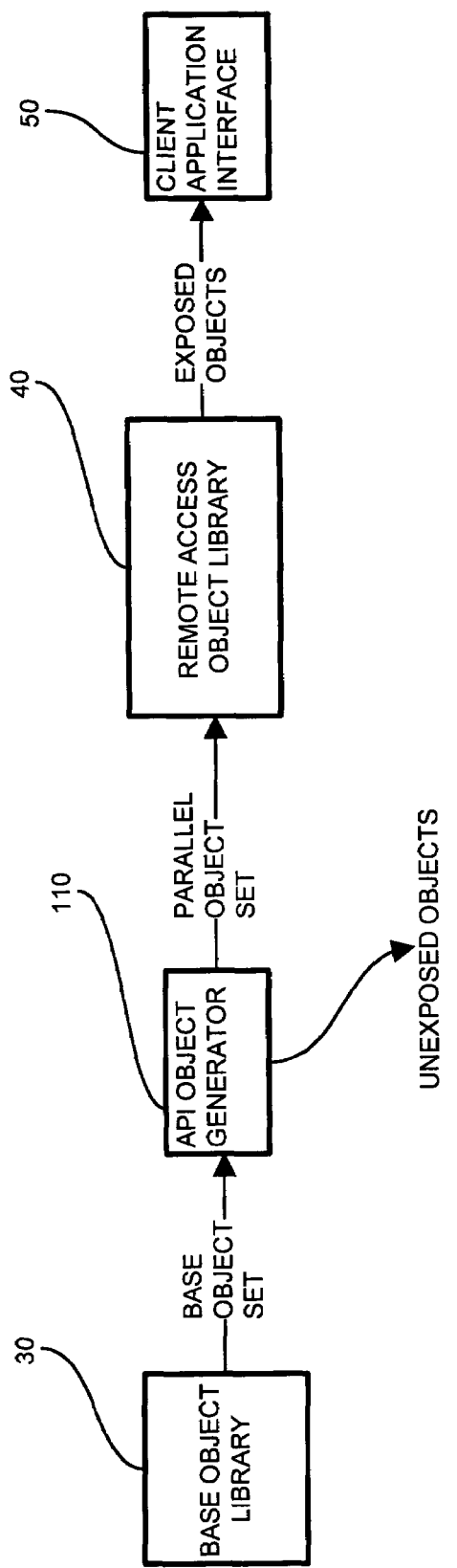
FIG. 11 is a dataflow diagram of the native and distributed client object libraries.

FIG. 11 is a dataflow diagram of the native and distributed client object libraries. Referring to FIGS. 2 and 11, the dataflow shows the relation of the definition, or build time of the remote access object library and deployment, or run time operation of the resulting client object space 42 and the dynamic link to the base application object space 32. Referring to FIG. 11, the base application 28 resident on the server 12 includes a set of objects, or model, in the base object library 30. The base object library 30 transforms, via copying and modification, for example, into a parallel set of object by the API object generator 110 above, less the unexposed objects, as the remote access object library 40. The remote access object library 40 and corresponding client application interface 50 are operable for deployment on the client application server 24.

In particular implementations, the object space is a main memory component of a computing system comprising the respective servers (12, 24). Accordingly, such a computer system includes the memory, a processor, and an interface, or bus, for interconnecting the memory, processor, and external devices such as input/output connections. In this manner, the object space is memory for instantiating and executing objects from the corresponding object library.

The information distribution system disclosed herein may encompass a variety of alternate deployment environments. In a particular configuration, the exemplary storage area network management application discussed may be the EMC Control Center application (ECC), marketed commercially by EMC corporation of Hopkinton, Mass., assignee of the present application.

Those skilled in the art should readily appreciate that the programs and methods for deploying and invoking a distributed object model as defined herein are deliverable to a processing device in many forms, including but not limited to a) information permanently stored on non-writeable storage media such as ROM devices, b) information alterably stored on writeable storage media such as floppy disks, magnetic tapes, CDs, RAM devices, and other magnetic and optical media Alternatively, the operations and methods disclosed herein may be embodied in whole or in part using hardware components, such as Application Specific Integrated Circuits (ASICs), state machines, controllers or other hardware components or devices, or a combination of hardware, software, and firmware components.

While the system and methods for deploying and invoking a distributed object model has been particularly shown and described with references to embodiments thereof, it will be understood by those skilled in the art that various changes in form and details may be made therein without departing from the scope of the invention encompassed by the appended claims. Accordingly, the present invention is not intended to be limited except by the following claims.

What is claimed is:

1. A computer system server for remote invocation of an object in a base object library via a remote access object library, comprising:
   a processor in a base application server;
   a memory in the base application server operable to store the base object library, the memory further including a base application object space operable to store and execute instantiations of the objects in the base object library;
   an interface including at least one adaptor operable to receive an API object reference to the remote access object library via a client application interface;
   an object mapping table in the memory operable identify a corresponding native object to the referenced API object reference in the base object library, the processor operable to instantiate the identified native object corresponding to the referenced API object in a client object space, and further operable to maintain a link between the instantiated API object and the corresponding native object, the link providing a dynamic reflection of the native object in the API object; and
   a build facility, the instantiating by the processor further employing the build facility to:
      identify templates corresponding to object types, the object types corresponding to operations for providing the remote API,
      define metadata for each of the objects for exposure in the remote API, the metadata identifying, for each of the exposed objects, runtime behavior of the object;
      identify, for each of the object types, available methods for each of the exposed objects in the remote access object library, the available methods defining a subset of methods in the corresponding base application object; and
      build, via an API object generator in the build facility, the exposed objects for invocation by the client application;
   the processor further operable to:
   receive an indication of invoking a traversal method in the API object in the remote access object space;
   identify, via an object identifier in the indication, the corresponding native object in the base application object space;
   determine a related object associated with the native object in the base object library; and
   transmit to a remote access object space, via a traversal service and the object identifier, an instantiation of the related object, the related object corresponding to the association to the native object in the base object library and the instantiation received from a copied object of the related object, the instantiation maintaining a dynamic link to the related object.

2. The computer system server of claim 1 wherein the processor is further operable to:
   copy, in the base application object space, the identified native object, the native object having attributes;
   identify, for the attributes of the native object, corresponding attributes in the copied object; and
   populate the corresponding attributes in the instantiated API object.

3. The computer system server of claim 2 wherein populating further comprises identifying attributes of the native object and determining, from metadata defining the remote access object library, attribute values of the corresponding instantiated API object.

4. The computer system server of claim 1 wherein the processor is operable to maintain the link by referencing, in a realtime manner, the native object in response to operations to the instantiated API object, such that the operations produce a nonduplicative, atomic result in the native object via the instantiated API object.

5. The computer system server of claim 1 wherein the object identifier is operable to uniquely identify an instantiation of an object in an object space.

6. The computer system server of claim 1 wherein the base object library further comprises exposed objects and local objects, each of the exposed objects having a corresponding native object in the object model, the exposed object operable to provide similar operations via the remote application interface as the corresponding native object, and further wherein invoking includes determining an exposure attribute indicative of whether the invoked object is an exposed object.

7. The computer system server of claim 1 wherein the base application object library defines a storage area network management application having a database of storage area network management information, the storage area network management application operable to manipulate agents corresponding to manageable entities, and wherein the remote access object library is a toolkit operable to provide API entry points into the storage area network management application in a nonintrusive manner for interrogating the agents and corresponding database.

8. The computer system of claim 1 wherein the processor is further operable to:
receive a set of changes modifying the native objects in the base object library; and
remap the links between the API objects and a new corresponding native object resulting from the modifying, wherein the client application interface remains unmodified such that the API object remain executable without rebuilding.

9. An encoded set of processor based instructions on a computer readable storage medium and responsive to a computer system processor which, when loaded into a memory of a computer and executed by the computer system processor, cause the computer to perform steps for defining and deploying a remote access object library corresponding to a base application object model, comprising:
a requirements instance manager operable to identify a subset of objects in the base application object model as exposure objects for inclusion the remote access object library, and further operable to define a client application interface accessible to a client application operable to provide accessibility references for the included objects;
metadata defined by the requirements instance manager, the metadata indicative of attributes for objects in the remote access object library;
an architecture mapper operable to define object templates corresponding to object types in the base application object model, the object templates further comprising:
an identification of object classes for the object types in the base application object model; and
attributes for each of the object types, the attributes operable for definition in the corresponding object in the remote access object library;
metadata identifying, for each of the object types, available methods for each of the exposure objects in the remote access object library, the available methods defining a subset of methods in the corresponding base application object in the base application object library;
an object mapping table in the memory operable identify a corresponding native object to the referenced API object reference in the base object library, the processor operable to instantiate the identified native object corresponding to the referenced API object in a client object space, and further operable to maintain a link between the instantiated API object and the corresponding native object, the link providing a dynamic reflection of the native object in the API object, the instantiated objects responsive to a build facility to:
identify templates corresponding to object types, the object types corresponding to operations for providing the remote API,
define metadata for each of the objects for exposure in the remote API, the metadata identifying, for each of the exposed objects, runtime behavior of the object; and
identify, for each of the object types, available methods for each of the exposed objects in the remote access object library, the available methods defining a subset of methods in the corresponding base application object;
build, via an API object generator in the build facility, the exposed objects for invocation by the client application;
an API object generator operable to generate the remote access object library from the metadata and the templates, such that each of the API objects are reflective of the API object for selectively exposing the corresponding native object, the instructions responsive to the processor to:
receive an indication of invoking a traversal method in the API object in the remote access object space;
identify, via an object identifier in the indication, the corresponding native object in the base application object space;
determine a related object associated with the native object in the base object library; and
transmit to a remote access object space, via a traversal service and the object identifier, an instantiation of the related object, the related object corresponding to the association to the native object in the base object library and the instantiation received from a copied object of the related object, the instantiation maintaining a dynamic link to the related object.

10. The computer system of claim 9 wherein the requirements instance manager is further operable to define metadata including, for each exposed object and a corresponding native object in the identified subset in the base application object library, attributes corresponding to at least one of delayed or immediate translation, object identifier keys, attribute name mapping and attribute type conversion.

11. A computer program product having a computer readable storage medium operable to store computer program logic embodied in computer program code encoded thereon as a set of processor based instructions which, when loaded into a memory of a computer and executed by the computer system processor, cause the computer to perform steps for remote invocation of an object in a base object library via a remote access object library, comprising:
computer program code for invoking, via a client application interface, an API object reference in the remote access object library;
computer program code for identifying a corresponding native object to the invoked API object reference in the base object library;
computer program code for instantiating an API object reflective of the identified native object in a client object space, the API object selectively exposing the corresponding native object; further comprising:

computer program code for identifying templates corresponding to object types, the object types corresponding to operations for providing the remote API;

computer program code for defining metadata for each of the objects for exposure in the remote API, the metadata identifying, for each of the exposed objects, runtime behavior of the object, the metadata further identifying, for each of the object types, available methods for each of the exposed objects in the remote access object library, the available methods defining a subset of methods in the corresponding base application object in the base object library; and computer program code for building, via an API object generator in the build facility, the exposed objects for invocation by the client application; and computer program code for maintaining a link between the instantiated API object and the corresponding native object, the link providing a dynamic reflection of the native object in the API object, maintaining the link further comprising referencing, in a realtime manner, the native object in response to operations to the instantiated API object, such that the operations produce a nonduplicative, atomic result in the native object via the instantiated API object, the instructions responsive to a processor to:

receive an indication of invoking a traversal method in the API object in the remote access object space;

identify, via an object identifier in the indication, the corresponding native object in the base application object space;

determine a related object associated with the native object in the base object library; and transmit to a remote access object space, via a traversal service and the object identifier, an instantiation of the related object, the related object corresponding to the association to the native object in the base object library and the instantiation received from a copied object of the related object, the instantiation maintaining a dynamic link to the related object.

12. A computer readable storage medium having a set of processor based instructions responsive to a computer having a processor and encoded as program code on the computer readable storage medium which, when loaded into a memory of the computer and executed by the processor, cause the computer to perform steps for remote invocation of an object in a base object library via a remote access object library, comprising:

program code for invoking, via a client application interface, an API object reference in the remote access object library;

program code for identifying a corresponding native object to the invoked API object reference in the base object library, the base object library defining a storage area network management application having a database of storage area network management information, the storage area network management application operable to manipulate agents corresponding to manageable entities, and wherein the remote access object library is a toolkit operable to provide API entry points into the storage area network management application in a nonintrusive manner for interrogating the agents and corresponding database;

program code for instantiating the identified native object as an API object in a client object space; further comprising:

program code for identifying templates corresponding to object types, the object types corresponding to operations for providing the remote API;

program code for defining metadata for each of the objects for exposure in the remote API, the metadata identifying, for each of the exposed objects, runtime behavior of the object, the metadata identifying, for each of the object types, available methods for each of the exposed objects in the remote access object library, the available methods defining a subset of methods in the corresponding base application object in the base object library; and program code for building, via an API object generator, the exposed objects for invocation by the client application; and program code for maintaining a link between the instantiated API object and the corresponding native object, the link providing a dynamic reflection of the native object in the API object, maintaining the link further comprising referencing, in a realtime manner, the native object in response to operations to the instantiated API object, such that the operations produce a nonduplicative, atomic result in the native object via the instantiated API object, the instructions responsive to a processor to:

receive an indication of invoking a traversal method in the API object in the remote access object space;

identify, via an object identifier in the indication, the corresponding native object in the base application object space;

determine a related object associated with the native object in the base object library; and transmit to a remote access object space, via a traversal service and the object identifier, an instantiation of the related object, the related object corresponding to the association to the native object in the base object library and the instantiation received from a copied object of the related object, the instantiation maintaining a dynamic link to the related object.

13. A computer system server responsive to a set of processor based instructions stored on a computer readable storage medium, the computer system server having a processor connected to the computer readable storage medium, for remote invocation of an object in a base object library via a remote access object library, comprising:

means for invoking, via a client application interface, an API object reference in the remote access object library;

means for identifying a corresponding native object to the invoked API object reference in the base object library;

means for instantiating the identified native object as an API object in a client object space; the means for instantiating further comprising:

means for identifying templates corresponding to object types, the object types corresponding to operations for providing the remote API;

means for defining metadata for each of the objects for exposure in the remote API, the metadata identifying, for each of the exposed objects, runtime behavior of the object, the metadata identifying, for each of the object types, available methods for each of the exposed objects in the remote access object library, the available methods defining a subset of methods in the corresponding base application object in the base object library; and means for building, via an API object generator, the exposed objects for invocation by the client application; and means for maintaining a link between the instantiated API object and the corresponding native object, the link providing a dynamic reflection of the native object in the API object, the API object having a direct reference linkage to a counterpart native object in the base application object space, maintaining the link further comprising referencing, in a realtime manner, the native object in response to operations to the instantiated API object, such that the operations produce a nonduplicative, atomic result in the native object via the instantiated API object, the instructions responsive to a processor to:

receive an indication of invoking a traversal method in the API object in the remote access object space;

identify, via an object identifier in the indication, the corresponding native object in the base application object space;

determine a related object associated with the native object in the base object library; and transmit to a remote access object space, via a traversal service and the object identifier, an instantiation of the related object, the related object corresponding to the association to the native object in the base object library and the instantiation received from a copied object of the related object, the instantiation maintaining a dynamic link to the related object.

* * * * *